US008726961B2

(12) United States Patent
Druet et al.

(10) Patent No.: US 8,726,961 B2
(45) Date of Patent: May 20, 2014

(54) DEVICE FOR TRANSFERRING AND ALIGNING STRIPS INTENDED TO BE ASSEMBLED TO FORM A PLY

(75) Inventors: Michel Druet, Gerzat (FR); Jacques Lauper, Coumon d'Auvergne (FR); Antoine Filiol, La Roche Blanche (FR); Pascal Martin, Corent (FR); Nicolas Jaunet, Chateaugay (FR); Gerard Buvat, Marsat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 311 days.

(21) Appl. No.: 13/139,516

(22) PCT Filed: Dec. 11, 2009

(86) PCT No.: PCT/EP2009/066981
§ 371 (c)(1),
(2), (4) Date: Nov. 29, 2011

(87) PCT Pub. No.: WO2010/066895
PCT Pub. Date: Jun. 17, 2010

(65) Prior Publication Data
US 2012/0067516 A1 Mar. 22, 2012

(30) Foreign Application Priority Data
Dec. 12, 2008 (FR) .................................. 08 58524

(51) Int. Cl.
*B29D 30/42* (2006.01)
*B29D 30/46* (2006.01)
*B32B 38/10* (2006.01)
*B32B 38/18* (2006.01)
*B32B 37/10* (2006.01)
*B32B 37/14* (2006.01)
*B65H 35/00* (2006.01)
*B65H 9/16* (2006.01)
*B60C 9/00* (2006.01)

(52) U.S. Cl.
USPC ..... 156/379.6; 156/396; 156/397; 156/405.1; 156/406.4; 156/512; 156/517

(58) Field of Classification Search
CPC ........ B29D 30/42; B29D 30/46; B32B 38/10; B32B 38/18; B32B 37/10; B32B 37/14; B65H 35/00; B65H 9/16; B65H 11/00; B60C 9/00
USPC ........ 156/379.6, 396, 397, 405.1, 406.4, 512, 156/517
See application file for complete search history.

(56) References Cited

U.S. PATENT DOCUMENTS 3,732,767 A * 5/1973 Habert ............................ 83/171
3,803,965 A * 4/1974 Alderfer .......................... 83/155

(Continued)

FOREIGN PATENT DOCUMENTS

EP 0958913 11/1999
JP 07 227919 8/1995

*Primary Examiner* — Linda L. Gray
(74) *Attorney, Agent, or Firm* — Cozen O'Connor

(57) ABSTRACT

A device for manufacturing a reinforcing ply N by assembling lengths of strip cut at an angle, comprising: a feed means (300) for delivering a strip (B), an assembly belt (101), a transfer means (200) for conveying onto the assembly belt a given length of straight-grain strip in a direction (AA') comprising a retaining wall (211), parallel to the planes of the assembly belt (101) and of the feed means, and a first face (211a) of which is intended to come into contact with the surface of the strip, in which device the feed means (300), the transfer means (200) and the assembly belt (101) are fitted with magnetic means. The retaining wall (211) is able to move up and down and back and forth, and the magnetic means are adjusted so that when the device is in operation: in the lowered position, the said magnetic means of the transfer means (212) exert on the metallic threads of the strip a magnetic field of a strength higher than the strength of the magnetic field exerted by the magnetic means (102, 103, 104) positioned on the feed means (300), in the raised position, the said magnetic means of the transfer means (212) exert a magnetic field of a strength weaker than the strength of the magnetic field exerted by the magnetic means positioned on the assembly belt (101).

9 Claims, 5 Drawing Sheets

(56) References Cited

U.S. PATENT DOCUMENTS

| | | | |
|---|---|---|---|
| 4,409,872 A | 10/1983 | Bertoldo | |
| 4,411,724 A | 10/1983 | Ito et al. | |
| 4,769,104 A | 9/1988 | Okuyama et al. | |
| 5,092,946 A | 3/1992 | Okuyama et al. | |

* cited by examiner

DEVICE FOR TRANSFERRING AND ALIGNING STRIPS INTENDED TO BE ASSEMBLED TO FORM A PLY

RELATED APPLICATION

This is a U.S. National Phase Application under 35 USC 371 of International Application PCT/EP2009/066981, filed on Dec. 11, 2009.

This application claims the priority of French patent application Ser. No. 08/58524 filed Dec. 12, 2008, the entire content of which is hereby incorporated by reference.

FIELD OF THE INVENTION

The field of the invention relates to the manufacture of reinforcing plies intended to be used in the construction of tires.

The invention related more specifically to reinforcing plies containing metal reinforcing threads.

BACKGROUND OF THE INVENTION

Tire reinforcing plies as a general rule are made up of reinforcing threads of a given physical length, coated in a rubber compound, which are parallel to one another and make a given angle to the longitudinal direction of the said ply.

These plies are obtained from plies known as straight-grain plies in which the reinforcing threads are parallel to the longitudinal direction of the straight-grain ply. Using a cutting means, lengths of ply are taken from the straight-grain ply at a given cutting angle, and the said portions of straight-grain ply are butted together via their respective selvedges to form an angled ply or reinforcing ply.

Numerous devices have been developed in industry for creating reinforcing plies that have the geometric features that are as close as possible to the specifications written for the creation of the tires.

The best known cutting devices operate as a general rule in a centralized way, and supply several assembly machines with continuous reinforcing strips. The assembly machines therefore comprise means capable of picking up the lengths of predetermined physical length that make up the said reinforcing plies. Thus, in order to optimize the productivity of these machines, steps are taken to ensure that straight-grain plies of great width are available.

As an alternative, it is also known practice for the reinforcing plies to be created directly upstream of the assembly machine. In this embodiment, the reinforcing ply is built up of tapes cut at an angle, taken from a straight-grain ply that comes in the form of a narrow strip. The tapes are assembled with one another via their selvedges. In practice, the straight-grain strip and the tapes have a width ranging between 10 and 25 mm.

A device of this type makes it possible to create the reinforcing ply at the desired physical length by a careful choice of the number of tapes that have to be juxtaposed.

By way of example, publication U.S. Pat. No. 3,682,222 gives a more specific idea of the device for assembling tapes in question, which device comprises a first means for delivering the narrow straight-grain strip, a cutting means for detaching a length of strip from the straight-grain strip, a reciprocating handling means for conveying the said length of straight-grain strip of given physical length, already cut at an angle to an assembly belt at a given angle, and an assembly means for welding the lengths of strip together via their respective selvedges.

Publication U.S. Pat. No. 4,411,724 also relates to a means of assembling strips taken from a straight-grain ply comprising a means of transfer between a cutting device and an assembly belt in which the strip is firmly held by magnetic means. However, the transfer of the strip from one belt to another contains regions in which the strip is free to determine its own path and not held by the said magnetic means, which means that unwanted movements of the strip with respect to the machine frame of reference can occur.

The invention relates to an improvement to a device for assembling tapes as described hereinabove.

The problem presented by this type of machine relates to how to maintain the geometric features of the strip and of the tape once the latter has been taken from the continuous strip, throughout the phases of transfer, adjusting to length, cutting and assembly. Specifically, because of its narrow width, the tape is subject to deformations and unwanted movements likely to impair the geometric quality of the reinforcing ply. It is therefore important that, at any moment, the strip or the tape should be kept referenced, with respect to the geometric frame of reference of the machine considered as being known and controllable.

Publication EP 958 913 seeks to provide partial solutions to this set of problems and proposes an improvement in which moving alignment walls positioned on each side of the tape act as guides to align the front and rear selvedges of the tape as precisely as possible. The spacing between the walls is substantially equal to the width of the tape.

However, this device fails to prevent the twistings of the strip that are likely to impair the geometry of the selvedges in contact with the said alignment walls.

SUMMARY OF THE INVENTION

One aspect of the present invention is directed to a device for manufacturing a reinforcing ply by assembling lengths of strip juxtaposed with one another via their respective selvedges, wherein the device comprises:
  a feed means for delivering a straight-grain strip formed of mutually parallel metallic threads coated in a rubber compound,
  an assembly belt,
  a transfer means for conveying onto the assembly belt from the feed means a given length of straight-grain strip in a direction that makes a given angle with the longitudinal direction of the assembly belt, and comprising a retaining wall parallel to the planes of the assembly belt and of the feed means, and a first face of which is intended to come into contact with the surface of the strip,
  a cutting means for detaching a length of strip from the straight-grain strip, in which device the feed means, the transfer means and the assembly belt are fitted with magnetic means able to keep the said strip pressed firmly against the surface of the feed means, of the first face of the transfer means, and of the assembly belt, respectively.

This device is characterized in that the retaining wall is able to move up and down and back and forth with respect to the planes formed by the assembly belt and the feed means, and in that the magnetic means of the transfer means are able to move with respect to the retaining wall in a direction perpendicular to the plane formed by the said retaining wall between a raised position and a lowered position, and are adjusted so that, when the device is in operation:
  in the lowered position, the said magnetic means of the transfer means exert on the metallic threads of the strip a magnetic field of a strength higher than the strength of the magnetic field exerted by the magnetic means positioned on the feed means, when the two opposite faces of the strip are simultaneously in contact with the first face of the retaining wall on the one hand, and with the surface (320) of the feed means on the other hand, and such that in the raised position, the said magnetic means of the transfer means exert on the metallic threads of the strip a magnetic field of a strength weaker than the strength of the magnetic field exerted by the magnetic means positioned on the assembly belt, where the two opposite faces of the strip are simultaneously in contact with the first face of the said retaining wall on the one hand, and with the surface of the assembly belt on the other hand.

This means that the strip of product is always in contact with at least one mechanical element whose position in space is known and controllable. Specifically, the strip of product is first of all held by the surface of the feed means, and then simultaneously by the surface of the feed means and by the retaining wall of the transfer means, and then by the retaining wall of the transfer means alone, then simultaneously by the retaining wall of the transfer means and the surface of the assembly belt, and finally by the surface of the assembly belt alone. This series of operations is intended to keep the product "referenced".

The technical effect afforded by this special feature is that at no time in the transfer cycle is the strip free to find its own path. This makes it possible to solve the technical problem associated with keeping the strip referenced by a magnetized surface in the geometric frame of reference of the machine, which is the only way of guaranteeing that the strip will be laid accurately on the tire, downstream of the assembly belt.

A similar result could be achieved by contriving for the magnetic field exerted by the magnetic means positioned on the feed means to be weaker than the magnetic field exerted by the magnetic means positioned on the transfer means, the latter field itself being weaker than the magnetic field exerted by the assembly belt. The magnetic fields of the various means could then have the same strength. This solution does, however, have the disadvantage of requiring magnetic means of increasing strength, which is not very compatible with industrial equipment currently in use in manufacturing workshops.

The benefit of the novel solution proposed by the invention, whereby the magnetic means positioned on the transfer means generates a magnetic field of adjustable strength, is that it allows the use of low-strength magnetic means installed on the feed means and on the assembly belt respectively.

All that is then required is for the strength of the magnetic field of the magnetic means positioned on the transfer means to be varied from a strength stronger than the strength of the magnetic field exerted on the strip by the magnetic means positioned on the feed means in order to take hold of the strip, to a strength weaker than the strength of the magnetic field exerted on the strip by the magnetic means positioned on the feed belt in order for the strip to be set down thereon.

DETAILED DESCRIPTION OF THE DRAWINGS

The strip B is a continuous strip formed of continuous metal threads coated with said rubber compound, parallel to one another and directed in the longitudinal direction of the strip.

The reinforcing ply N to be created using the device is formed of lengths of metal thread of given physical length, coated in a rubber compound, parallel to one another, and making an angle $\alpha$ to the longitudinal direction XX'. More specifically, this ply N is made up of an assembly of a whole number of lengths of strip taken from the strip B, and assembled via their respective selvedges. In each cycle of the manufacturing device, one length of strip is set down on the assembly belt.

Figure 1:
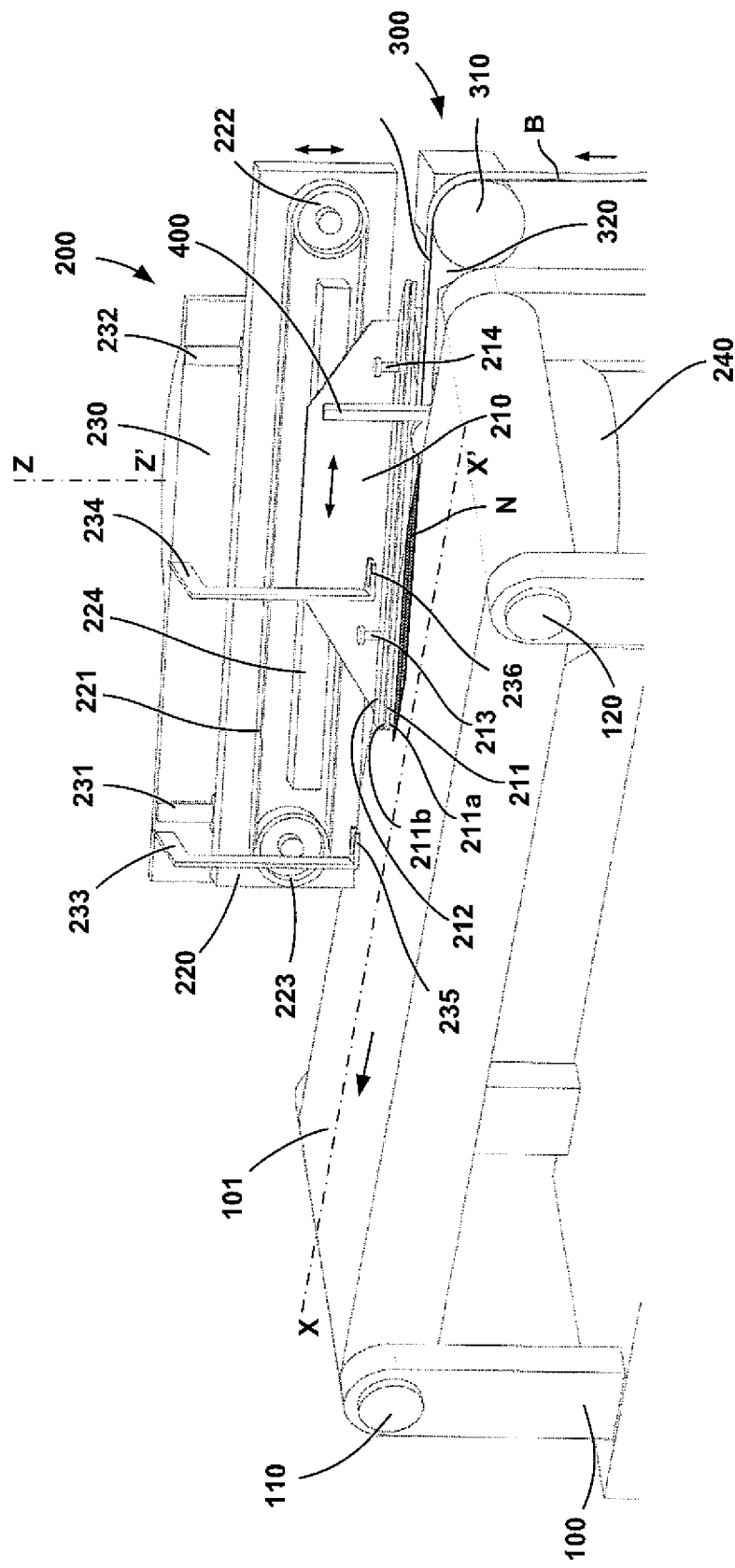
FIG. 1 depicts a schematic perspective view of a device according to an embodiment of the invention.
Figure 2:
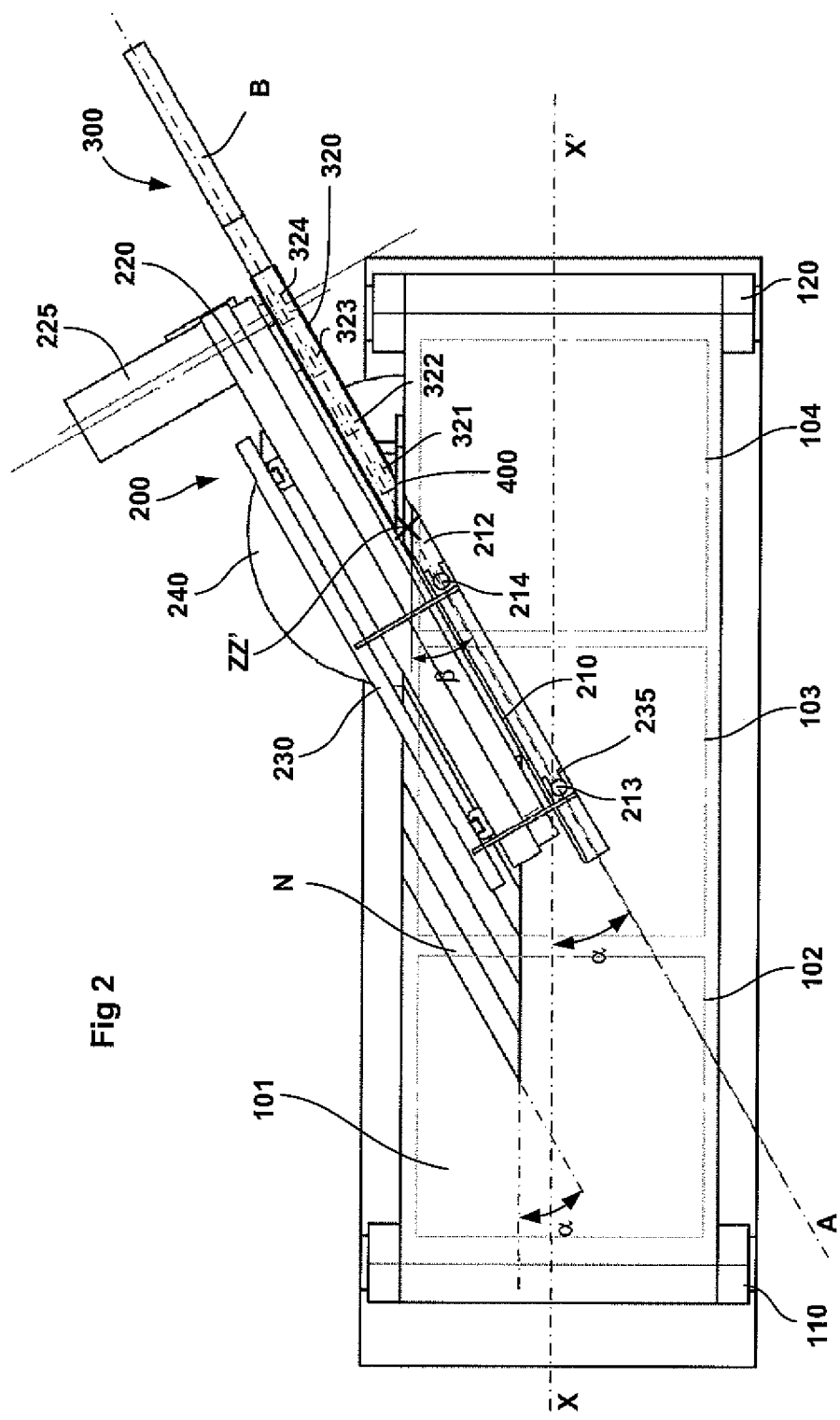
FIG. 2 depicts a view of the device from above.

The reinforcing ply manufacturing device illustrated in FIGS. 1 and 2 comprises a framework 100 supporting an assembly belt 101, running between two rollers 110 and 120. One of the rollers is turned by a motor (not depicted) to allow the belt to run in a longitudinal direction XX' represented by an arrow. In each manufacturing cycle, the assembly belt advances by a step of determined length.

Magnetic means 102, 103, 104 are positioned under the surface of the assembly belt 101 and apply a magnetic field to the metal threads of the ply N positioned on the surface of the said assembly belt. The strength of this field is determined in a known way, so that the ply is pressed firmly against the surface of the belt on the one hand, while on the other hand still allowing the belt to run without excessive friction.

The feed means 300 comprises storage and pay-out means (not depicted) so that a given physical length of the strip B can be conveyed on demand, and also comprises a feed roller 310 and a starter block 320 over which the strip B is made to slide.

The plane formed by the surface of the starter block 320 is substantially parallel to the plane formed by the upper surface of the assembly belt 101. For convenience, steps are also taken to ensure that the surface of the assembly belt 101 and the surface of the starter block 320 lie in one and the same plane.

Magnetic means 321, 322, 323, 324 are positioned under the surface of the starter block 320 and exert a magnetic field on the strip B. This magnetic strip has the effect of pressing the strip firmly against the surface of the starter block and of creating friction that opposes sideways movements of the strip when the latter is being driven along the axis AA' towards the assembly belt. The direction AA' is parallel to the plane of the assembly belt and makes a given angle $\alpha$ with the direction XX'.

The transfer means 200 and the feed means 300 are mounted on a turret 240 positioned on the framework 100. The turret is able to turn about an axis ZZ' perpendicular to the plane of the assembly belt 101. The angle $\alpha$ is adjusted by turning the turret 240 about its axis ZZ'. The angle $\alpha$ corresponds to the angle formed by the direction of the threads of the strip with the longitudinal direct ion XX' of the ply being manufactured.

Steps are taken to ensure that the path along which the strip travels through the feed means is perfectly aligned with the path along which the strip travels through the transfer means, these paths coinciding with the direction AA'.

The transfer means 200 comprises a first frame 230, secured to the turret 240. This frame supports two slides 231 and 232, directed in the direction ZZ'.

A second frame 220 is mounted so that it can slide on the two slides 231 and 232. The frame 220 moves up and down with respect to the plane of the belt 101 and of the starter block 320 under the action of a drive motor (not depicted).

The second frame 220 in turn supports a slide 224 directed in the direction AA'.

A transfer frame 210, slides on the slide 224 under the action of a drive belt 221 running between two pulleys 222 and 223. One of the pulleys is turned by a motor 225 so that the transfer frame moves back and forth between a first position situated in line with the starter block 320 and a second position situated in line with the assembly belt 101.

Thus, the transfer frame on demand effects an up and down reciprocating movement with respect to the surface of the belt 101 or of the starter block 320, and effects reciprocating back and forth movement in the direction AA'.

The transfer frame on its lower part comprises a retaining wall 211 situated in a plane parallel to the planes formed by the surface of the assembly belt and by the surface of the starter block. The retaining wall 211 has a first face 211a facing the surface of the assembly belt 101 and the surface of the starter block 320. The second face 211b of the retaining wall, which is on the opposite side to the first face 211a, supports the magnetic means 212 able to exert a variable magnetic field with respect to the said first phase 211a of the said retaining wall 211.

In this particular instance, the said magnetic means are formed by a magnetized plate 212 comprising permanent magnets of the neodymium iron boron type. For preference, the retaining wall 211 will be made of a non-magnetic material so that it does not block the fields induced by the magnetized plate 212.

The ends of the magnetized plate 212 and of the retaining wall 211 which are positioned on the feed means side make an angle with the direction XX'. Ideally, the angle β ought to be equal to the angle α. However, that would entail varying this angle β for each angle α. Hence, in practice, a mean value which is fixed once and for all is determined for this angle β according to the size of the angles of the plies to be manufactured using the device of the invention.

The plate 212 is positioned on the same side as the second face 211b of the retaining wall 211 against which it rests. This plate has attachment means 213 and 214.

Lifting means 233 and 234 are fixed to the frame 230. These lifting means have at their ends forks, 235 and 236 respectively, able to collaborate with said attachment means 213 and 214 so that when the said attachment means 213 and 214 are engaged in the said forks 235 and 236 respectively, the movement of the transfer frame 210 in the direction ZZ' has the effect of moving the said magnetized plate 212 away from or closer to the second face 211b of retaining wall 211.

This causes the strength of the magnetic field on the first face 211a of the retaining wall 211 to vary.

Steps have been taken to ensure that the magnets of the magnetized plate 212 are capable of exerting on the metal threads of the strip a magnetic field of a strength very much greater than the strength of the magnetic field exerted by the magnetic means 321, 322, 323, 324 positioned under the surface of the starter block 320 when the two opposite faces of the strip are simultaneously in contact with the first face 211a of the retaining wall 211 on the one hand, and with the surface of the starter block 320 on the other hand.

Thus, as the strip B travels on one of its faces along the surface of the starter block 320 and the retaining wall comes into contact with the other face of the said strip, all that is required is for the magnetized plate 212 to be brought closer to the second face 211b of the retaining wall 211 and this will cause the strip B to adhere to the first face 211a of the retaining wall. That is how the end of the strip B is picked up from the starter block 320 using the transfer means 200.

Contrastingly, when the retaining wall 211 is pressing the strip B against the surface of the assembly belt 101, all that is required is for the magnetized plate 212 to be moved away from the second face 211b and this reduces the strength of the magnetic field pressing the strip B against the first face 211a to a strength that is very much weaker than the strength of the field exerted on the metal threads of the strip by the magnetic means 102, 103 and 104 positioned under the surface of the assembly belt 101. This is the procedure that will be used to set the strip down on the assembly belt 101.

The use of a variable strength magnetic field on the transfer means makes it possible to choose magnetic means that apply fields of modest and substantially identical strength at the surface of the starter block 320 and at the surface of the assembly belt 101. This solution makes it possible to reduce the strength of the magnetic fields to the minimum required to achieve the strip retaining function.

The various steps of an operating cycle of the device are illustrated in FIGS. 3 to 9.

Prior to starting up the device it is necessary to determine the operating parameters, namely the angle α, the whole number of lengths of strip that are to be assembled, the length of the step via which the assembly belt advances at the end of the cycle, and the physical length of the lengths of strip to be cut as a function of the angle and of the physical length of the reinforcing ply that is to be obtained, the width of the ply or the length of the threads in the ply, and the known and constant width of the strip B.

The methods that can be used for calculating this whole number of lengths of strip to be assembled are known and involve:
either slightly varying the distance between the selvedges intended to be juxtaposed of two successive lengths of strip, by altering the step length of the assembly belt at the end of each cycle of laying one length of strip on the said assembly belt, as described in publication EP 1 095 761; the value of the angle α is then equal to the value of the theoretical angle, but the density of a thread in the reinforcing ply is modified slightly by comparison with the desired theoretical value,
or slightly modifying the value of the angle of the threads in the ply with respect to the desired theoretical angle, keeping the assembly belt step length at a value that allows the selvedges of the lengths of ply to be juxtaposed without any separation between the threads, as proposed in publication EP 958 913; the thread density then corresponds to the desired density.

The turret 240 is then turned in order to obtain the angle α desired according to one method or the other.

Figure 3:
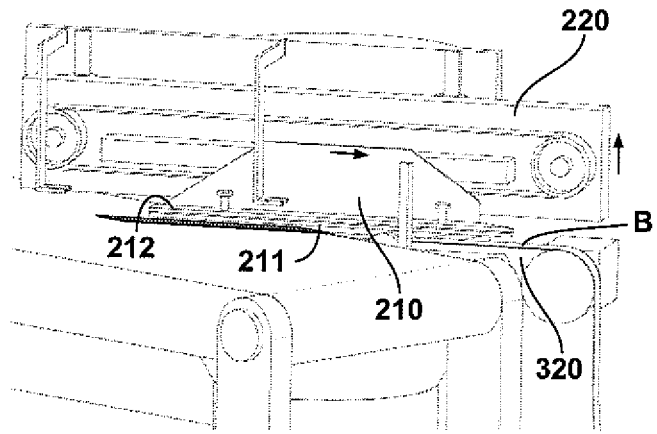
FIGS. 3 to 9 depict schematic perspective views of the various steps in the use of the device.
Figure 4:
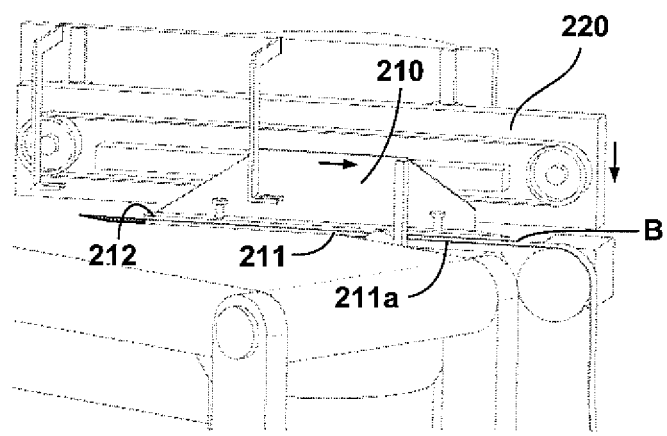

FIG. 3 depicts the first step in the cycle in which the second frame 220 is brought into the raised position, and the transfer frame 210 is positioned in line with the starter block 320. The magnetized plate 212 rests against the second face 211b of the retaining wall 211. The end of the strip B is held firmly pressed via its lower face against the surface of the starter block by the magnets 321, 322, 323, 324.

The second frame 220 in then lowered in order to bring the first face 221a of the retaining wall 221 into contact with the upper face of the end of the strip B. The magnetized plate 212 remains in contact with the second face 211b of the retaining wall 211. The end of the strip B is then attracted to the first face 211a of the retaining wall 211 as has been illustrated in FIG. 4.

Figure 5:
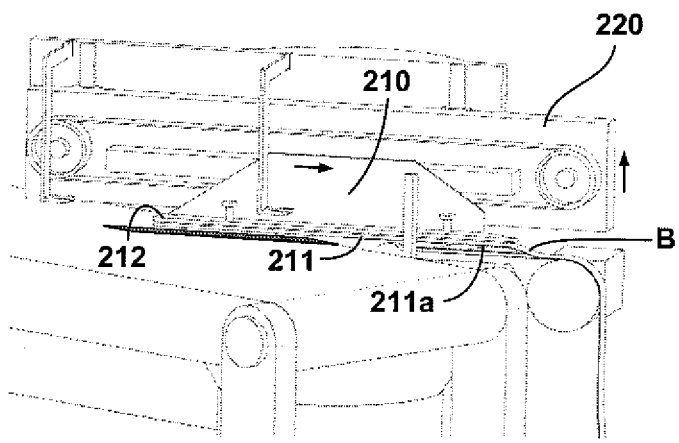

In the next step, which is illustrated by FIG. 5, the second frame 220 is raised while at the same time keeping the magnetized plate 212 in contact with the second face 211b of the retaining wall 211. The end of the strip is kept firmly pressed against the face 211a of the retaining wall 211.

It will be noted that, in order to keep the strip within the machine frame of reference, it is advantageous to ensure that the retaining wall 211 covers the length of strip over its entire surface.

Keeping the second frame 220 in the raised position, the transfer frame is moved and the end of the strip is brought into line with the assembly belt 101. The magnetized plate 212 is kept in contact with the second face 211b of the retaining wall 211, and this keeps the end of the strip pressed firmly against the first face 211a of the retaining wall 211. The length of this travel corresponds to the physical length of the desired length of strip and to the physical length of the threads in the ply N.

Figure 6:
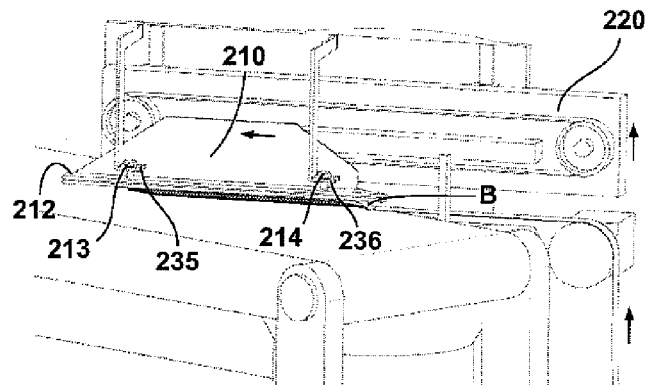

While the strip is being driven in the direction AA' by the transfer means and sliding over the starter block 320, the feed means is activated to deliver a corresponding length of strip. During this movement, the strip is kept firmly against the surface of the starter block by the magnetic means 321, 322, 323, 324 positioned under its surface. FIG. 6 illustrates the position of the respective components at the end of this step.

It may be seen that the attachment means 213 and 214 are engaged in the forks 235 and 236 positioned at the ends of the lifting means 233 and 234.

Figure 7:
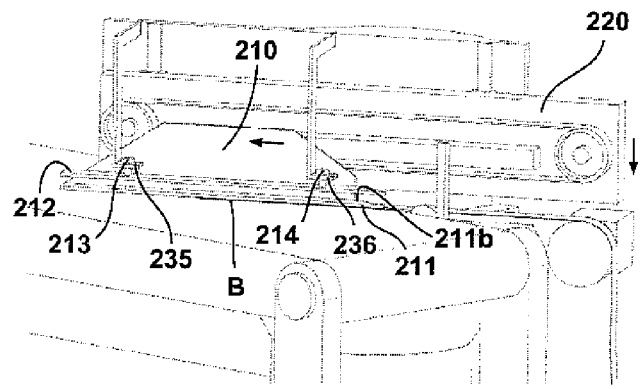

The next step is illustrated in FIG. 7 and during it the second frame 220 is lowered. This movement allows the end of the strip to be set down on the surface of the assembly belt 101. The magnetized plate 212 remains held in the raised position by the forks 235 and 236 and this has the effect of moving the said magnetized plate 212 away from the second face 211b of the retaining wall 211. This results in a significant weakening of the magnetic field in the region of the first wall 211a.

Figure 8:
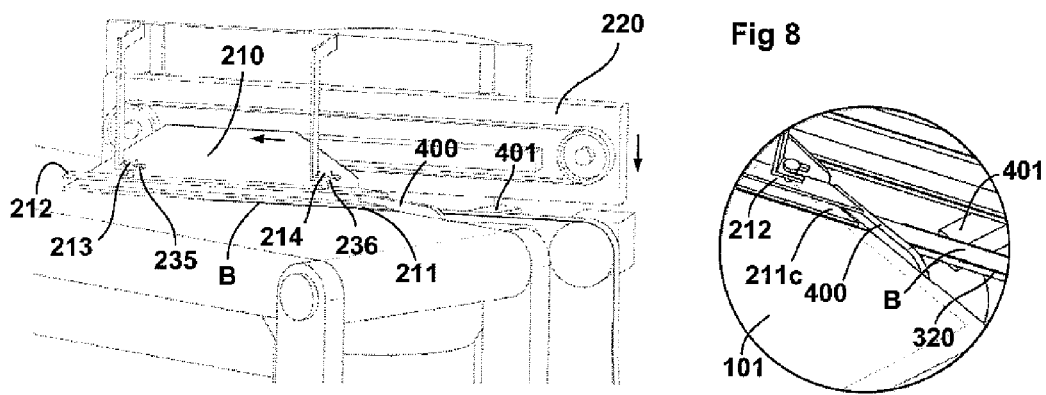

The rotary cutter is then activated as illustrated in FIG. 8 to extract a length of strip. While the strip is being cut, the retaining wall 211 applies a light pressure so as firmly to contain the end of the strip between the second face 211a of the retaining wall and the surface of the belt 101.

The edge of the belt 101 at this location has a reinforcing piece (not depicted). The end 211c of the retaining wall 211, in collaboration with the said reinforcing piece, then acts as an anvil, as has been illustrated in the circled detail of FIG. 8, to ensure that the strip receives a perfect cut.

The pressure applied by the retaining wall 211 to the surface of the length of strip also allows the rear selvedge of the strip N and the front selvedge of the length of strip freshly laid down on the assembly belt to be joined together. The forward direction being understood as meaning the direction in which the assembly belt progresses in the direction XX'.

Figure 9:
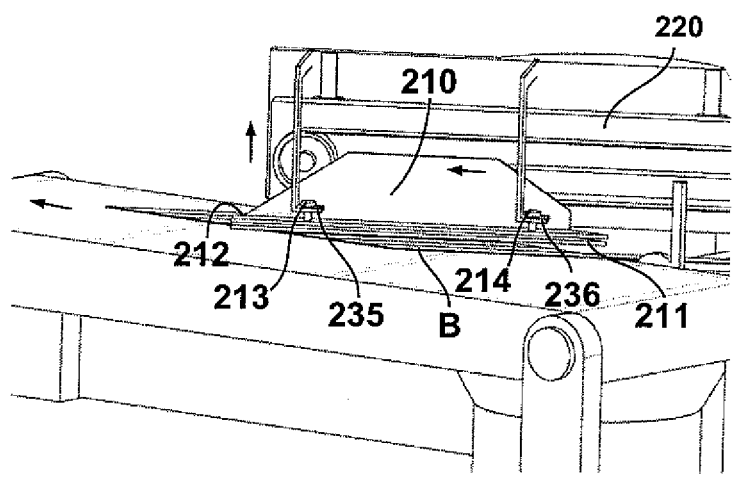

During the last stage in the cycle, which is illustrated in FIG. 9, the second frame 220 is raised. The strength of the magnetic field applied by the magnetized plate 212 on the second face 211a of the retaining wall 211 is very much weaker than the strength of the field applied by the magnetic means 102, 103 and 104 positioned under the surface of the belt so the length of strip remains firmly pressed against the surface of the assembly belt 101. At the end of this step, the magnetized plate is brought back into contact with the retaining wall. The belt is advanced by a given step, the length of which is equal to the width of the strip multiplied by the inverse of the sine of the angle α.

The above description is based on a specific device corresponding to the implementation of the invention as claimed.

It should be pointed out that this embodiment can be varied in numerous ways.

In particular, the way in which a variable strength magnetic field is obtained can be achieved using permanent magnets that can move as described hereinabove, but can also be achieved using variable-current electromagnetic means.

Likewise, it is possible to conceive of all kinds of means capable of driving the relative up and down and back and forth movements of the transfer frame and of the retaining wall, and the movement of the magnetized plate with respect to the retaining wall, without departing from the spirit of the invention.

The invention claimed is:

1. A device for manufacturing a reinforcing ply N by assembling lengths of strip cut at an angle, and juxtaposed with one another via their respective selvedges, comprising:
    a feed means for delivering a straight-grain strip formed of mutually parallel metallic threads coated in a rubber compound;
    an assembly belt;
    a transfer means for conveying onto the assembly belt from the feed means a given length of straight-grain strip in a direction that makes a given angle with the longitudinal direction of the assembly belt, and comprising a retaining wall, parallel to planes formed by an upper surface of the assembly belt and a surface of the feed means, and a first face of which is intended to come into contact with the surface of the strip;
    a cutting means for detaching a length of strip from the straight-grain strip, in which device the feed means, the transfer means and the assembly belt are fitted with magnetic means able to keep the said strip pressed firmly against the surface of the feed means, of the first face of the transfer means, and of the assembly belt, respectively,
    wherein the retaining wall is able to move up and down and back and forth with respect to the planes formed by the upper surface of the assembly belt and the surface of the feed means, and wherein the magnetic means of the transfer means is able to move with respect to the retaining wall in a direction perpendicular to a plane formed by said retaining wall between a raised position and a lowered position, and are adjusted so that, when the device is in operation:
    in the lowered position, said magnetic means of the transfer means exerts on the metallic threads of the strip a magnetic field of a strength higher than the strength of the magnetic field exerted by the magnetic means positioned on the feed means, when the two opposite faces of the strip are simultaneously in contact with the first face of the retaining wall on the one hand, and with the surface of the feed means on the other hand, and such that
    in the raised position, said magnetic means of the transfer means exerts on the metallic threads of the strip a magnetic field of a strength weaker than the strength of the magnetic field exerted by the magnetic means positioned on the assembly belt, where the two opposite faces of the strip are simultaneously in contact with the first face of said retaining wall on the one hand, and with the surface of the assembly belt on the other hand.

2. The device according to claim 1, wherein the magnetic means positioned on the feed means and on the assembly belt exert on the surface of the feed means and of the assembly belt, a magnetic field of approximately equal strength.

3. The device according to claim 1, wherein the retaining wall is adjusted so that when the device is in operation, said wall covers the entire surface of the length of strip.

4. The device according to claim 1, wherein the said retaining wall is made of a nonmagnetic material.

5. The device according to claim 1, wherein one of the ends of the retaining wall acts as an anvil for the cutting tool.

6. The device according to claim 1, wherein said magnetic means are electromagnetic elements or permanent magnets.

7. The device according to claim 1, wherein the surface intended to receive the lengths of strip of the assembly belt and the surface over which the strip travels on the feed means lie substantially in one and the same plane.

8. The device according to claim 1, wherein the cutting means comprises a rotary cutter.

9. The device according to claim 1, wherein the transfer means is mounted on a rotary turret able to rotate about an axis perpendicular to the plane formed by the upper surface of the assembly belt.

\* \* \* \* \*